Patented June 19, 1923.

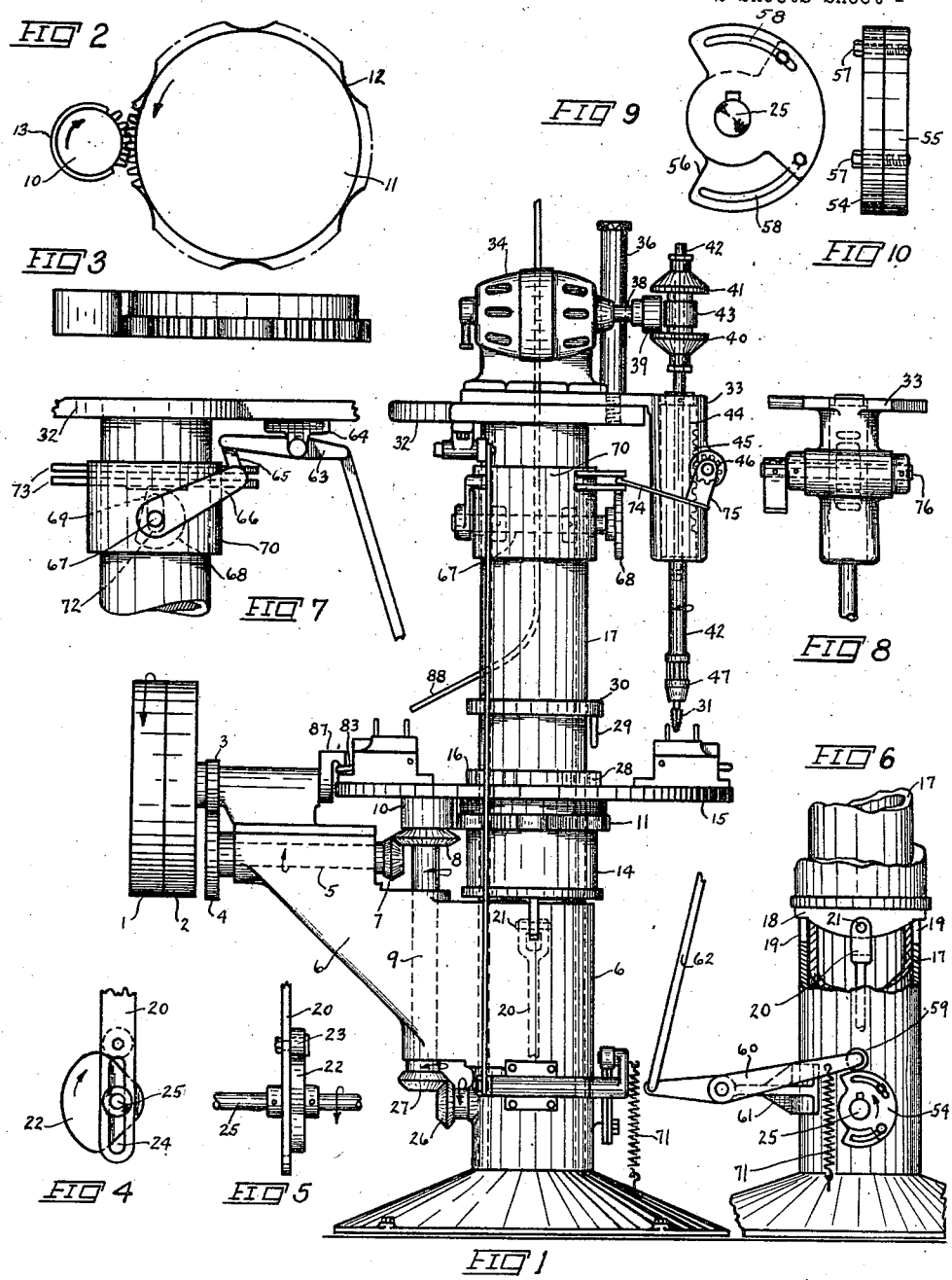

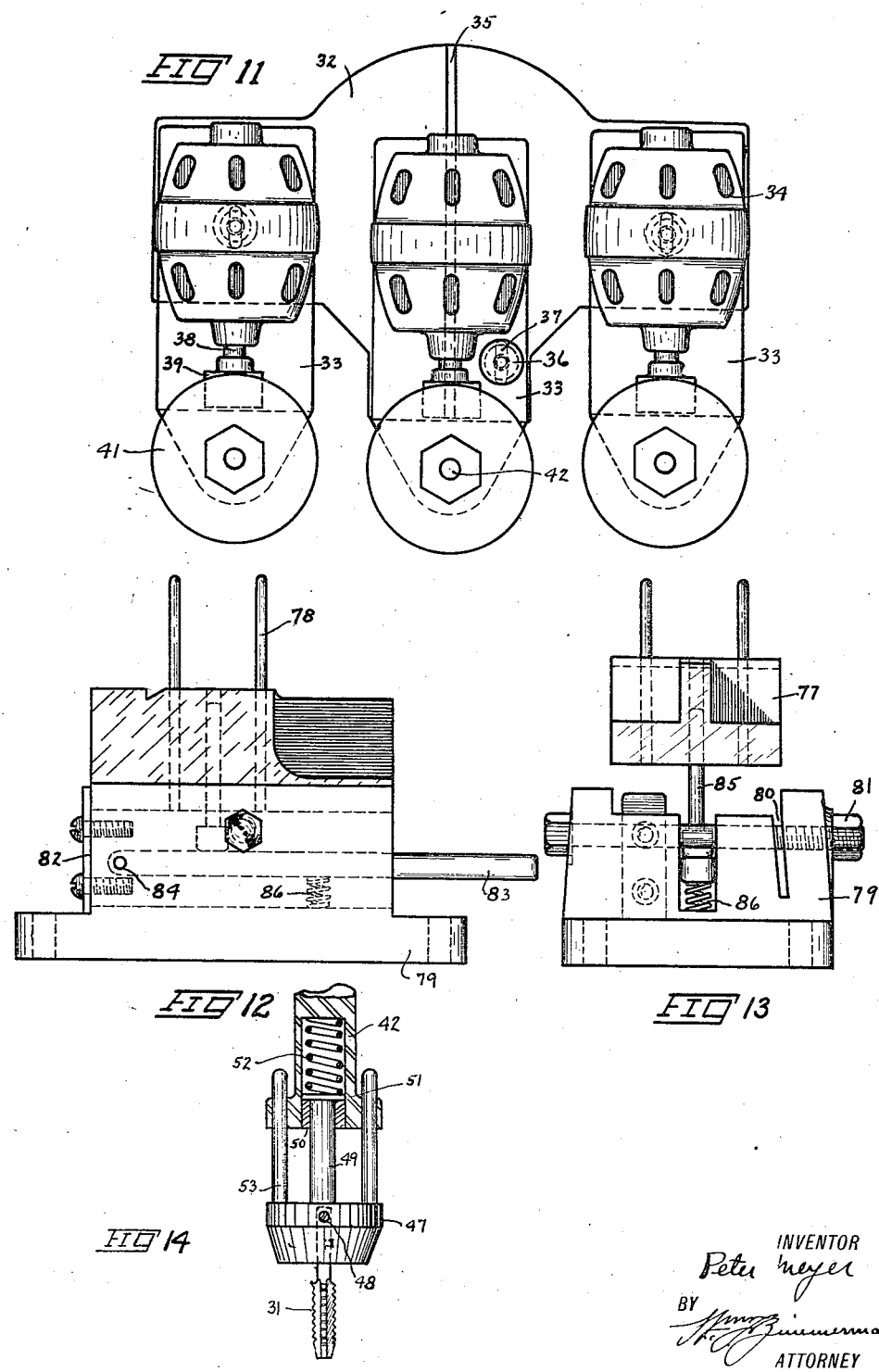

1,458,948

UNITED STATES PATENT OFFICE.

PETER MEYER, OF NEWARK, NEW JERSEY.

AUTOMATIC MULTIPLE-TAPPING MACHINE.

Application filed November 18, 1921. Serial No. 516,057.

*To all whom it may concern:*

Be it known that I, PETER MEYER, a citizen of the United States, and a resident of Newark, in the county of Essex and State of New Jersey, have invented certain new and useful Improvements in an Automatic Multiple-Tapping Machine, and do hereby declare the following specification, taken in connection with the drawings forming part of same, to be a full, clear, concise, and exact description of the invention and the best mode contemplated to apply the principle thereof, so as to distinguish it from other inventions and to enable any person skilled in the art to which it appertains or with which it is most nearly connected to make, construct, and use the same.

This invention relates primarily to a tapping machine and more particularly to a machine adapted to tap holes in small parts used in phonographs, clocks, electrical or similar appliances.

The invention contemplates as its primary object a simple automatic tapping machine having one or more tapping spindles.

Another object is to provide means whereby several holes can be tapped automatically in one operation regardless of their spacing relative to each other.

A further object is to provide a simple and inexpensive contrivance to hold the work during the tapping operations.

A further object is to provide means connected with the work holders to permit the work to float on the tap during the tapping and reversal of the tap in the work, without stripping the thread therein.

This invention comprises a series of tapping spindles adjustably mounted, reversing means to rotate said taps in either direction, a work table, means to intermittently rotate said table during the non-tapping period, means to lock said table during the tapping operation, means to feed said table toward and from said tapping spindles and means connected to the table rotating and feeding means to control the reversing of said tapping spindles.

Other objects will be apparent from, and are incorporated in the annexed drawings and in the following description, which sets forth in detail, certain contrivances embodying means constituting however, but one of the various mechanical forms in which the principle of the invention may be used.

The novelty of the invention will be readily understood from the drawings, which show a construction for practising the invention in its preferred form, and from the following description thereof, the invention being more specifically pointed out and distinctly claimed in the claims annexed to said description.

In the drawings:

Fig. 1 is an elevation of the invention illustrating the general construction.

Fig. 2 shows the interrupted gear arrangement for intermittently rotating or positioning the work table.

Fig. 3 is a side view of same.

Fig. 4 illustrates the feeding arrangement of the work table toward and from the tapping spindles.

Fig. 5 is a side elevation of same.

Fig. 6 is a fragmental side view of the lower part of Fig. 1 and shows the tap reversing control connected to the table operating means.

Figs. 7 and 8 are fragmental side views of the upper portion of Fig. 1 showing the tap reversing control lever arrangement.

Fig. 9 is an enlarged view of the adjustable tap control cam.

Fig. 10 is a side elevation of same.

Fig. 11 is a plan view of a series of tapping spindles each connected to individual motors.

Fig. 12 is a side elevation of the work holding device.

Fig. 13 is an end view of the work holder showing the upper portion separated from the lower or clamping means.

Fig. 14 is an enlarged sectional view of the tap holder.

Referring particularly to Fig. 1 the pulleys 1 and 2 are arranged to rotate on a suitable stud in the conventional manner and are connected to any suitable source of power. The pulley 2 has secured to it the gear 3 which meshes with and rotates the gear 4. A shaft 5 mounted in the frame 6 is rotated by said gear 4 and has secured to the other end the bevel gear 7 which meshes with the bevel gear 8. A shaft 9 vertically arranged in the frame 6 is rotated by the bevel gear 8.

A gear 10 with teeth cut in only a part thereof is secured to and rotates with said shaft 9 and engages with an interrupted or mutilated gear 11. This arrangement, shown more clearly in Figs. 2 and 3 is similar in action to the Geneva stop motion. The gears 10 and 11 can be operated in either direction but are shown rotating in one direction only to enable the correlation of motions of the entire mechanism to be more clearly described. The gear 11 is preferably provided with six sets of teeth between each of which there is a semicircular part 12 removed. The teeth of the gear 10 are shown in mesh with one set of teeth on the gear 11, and further rotation of the gear 10 will bring the solid portion 13 of gear 10 into the semicircular part 12, whereupon motion of gear 11 ceases until the teeth on gear 10 again come into contact with the next series on gear 11. It will be seen from the construction as shown that the interrupted gear 11 is rotated only during part of the revolution of the gear 10 and is then substantially locked for a definite period.

The interrupted gear 11 is secured to a guide sleeve 14 and to the work table 15. A locking plate 16 is fastened to the upper part of the work table 15. The gear 11, guide sleeve 14 and plate 16 are rotatably and slidably mounted on the cylindrical column 17, which is secured to the frame 6. A cross bar 18 is secured to the lower end of the guide sleeve 14 and is arranged to be guided in the slots 19. A link 20 hinged at 21 to said cross bar 18 is operated in a vertical direction by the cam 22 in contact with the roller 23 on the link 20. A slot 24 is provided in the link 20, through which the cam shaft 25 passes. The cam shaft 25 is mounted in the frame 6 and is rotated by the bevel gear 26, meshing with the gear 27 secured to the vertical shaft 9.

The cam 22 which is connected to the work table positioning mechanism raises or lowers the work table 15 during the period when the solid portion 13 of the gear 10 is in the semi circular part 12 of gear 11. The locking plate 16 is provided with six locating holes 28 corresponding in number to the semi circular portion 12 in the interrupted gear 11. A pin 29, secured in the ring 30 on the column 17 is arranged to enter the holes 28 and positively locate and lock the work table 15 when the same is raised toward the taps 31.

The column 17 is provided at its upper end with a plate 32 upon which the tapping spindle holders 33 are mounted. In the drawings three tapping spindles are shown which are particularly adapted to tap the contact plates in electrical fuses. It is obvious, however, that any number of spindles may be employed within the range of the machine.

Individual motors 34 are provided for each tap. For a single purpose arrangement the tapping spindles can be rotated from a common source or suitable universal joints can be provided to permit some adjustability to the tap spindles.

The motors 34 are each suitably secured to their respective spindle holders 33. The plate 32 is provided with a keyway 35 to limit the adjustment of the middle motor in one direction only. A clamping screw 36 secures the middle motor and spindle holder 33 to the plate 32. A slot 37 in the holder 33 and through which clamp screw 36 passes, permits endwise movements of the motor. The two end motors and tap spindle holders are secured to the plate 32 in a similar manner as just described, with this exception that the keyway is omitted to permit the end motors to be adjusted in any direction within the limits of the slots provided.

The motor shaft 38 is provided with a friction wheel 39, which is alternately engaged by the friction disks 40 and 41 to frictionally rotate the tapping spindle 42 in either direction. The friction disks 40 and 41 are adjustably secured to a sleeve 43 whereby the disks can be adjusted to insure proper frictional contact with the friction gear 39. The adjustment means for the disks is not shown and can be of any conventional type. The disks 40 and 41 can be made of different diameters to vary the rotative speed.

The sleeve 43 is fastened to the tapping spindle 42 to rotate same in either direction. The spindle 42 is rotatably mounted in the carrier 44 slidably arranged in the holder 33. Rack teeth 45 provided on said holder 33 engage with a pinion 46 whereby the tapping spindle 42 is raised and lowered.

The tap 31 is secured in a chuck 47 by means of a screw 48. A stem 49 on the chuck 47 slides through a bush 50 in the spindle 42. A shoulder 51 on the stem 49 limits the downward movement of the chuck 47, a spring 52 presses the chuck 47 in a downward direction and provides a resilient means for the tap 31, when entering the work to be tapped. The chuck 47 is rotated by pins 53 secured thereto and slidably arranged in the spindle 42.

The means for moving the tapping spindle 42 either up or down, at the proper time in the cycle of operation, so as to reverse its rotation, consists of cam 54 secured to and rotating with the shaft 25. A similar cam 55 is adjustably arranged with respect to cam 54, as shown in Figs. 9 and 10, so as to vary the width of the depression 56. Bolts 57 in slots 58 maintain the cams in the adjusted position. A roller 59 operates on both faces of the cams 54 and 55 and is controlled by their form. The lever 60 to which the roller 59 is secured is fulcrumed in the bracket 61 and has a rod 62 attached to the other end thereof.

This rod 62 is attached to a lever 63 which pivots in a bracket 64 secured to plate 32. A short link 65 connects lever 63 with the crank arm 66. A shaft 67 journalled in the column 17 is connected to the crank arm 66 and has a cam 68 secured to the other end thereof. The cam 68 is circular in form with the exception of a flat portion 69.

A sliding member 70 is arranged to move along the column 17 and is operated by the cam 68. A spring 71 which keeps the roller 59 in contact with cams 54 and 55 also maintains the sliding member 70 against the cam 68. Slots 72 are provided in the sliding member 70 to permit vertical movement without interfering with the shaft 67.

Two semi-circular projections 73 are provided on the sliding member 70 and form a groove in which the tap spindle operating levers 74 can be arranged.

The tap operating lever 74 is secured to an arm 75 fastened to a shaft 76, rotatably mounted in the holder 33. The rack pinion 46 is secured to and operated by the shaft 76 to raise and lower the taps 31.

The semi-circular projections 73 can be of any convenient proportions to enable the tapping spindles to be properly located and proper contact with the tap operating levers 74 maintained.

The work holding means, more clearly illustrated in Figs. 12 and 13 are six in number and equivalent to the number of the interruptions on gear 11. Three work holders are used for the tapping operation and three for loading and ejecting the parts operated upon.

The work holding block 77 is shaped to suit the piece to be tapped. In the drawings the work holders are formed especially for the flat plates used in fuse plugs. Four pins 78 are provided between which the work piece is located and is prevented from being rotated during the tapping operation.

The pins 78 are extended considerably beyond the blocks for the purpose of permitting the work pieces to float up and down during the tapping operation. The floating action is very essential to prevent the stripping of threads and to maintain correct and uniform sizing of the tapped holes.

The bolster 79 is adapted to clamp the work holders 77 by means of the slot 80 and bolt and nut 81. These bolsters are secured to the work table 15 relatively to the spaces 12 in the interrupted gear 11. A guide plate 82 is provided on the bolsters to locate the work holders 77.

A work ejecting device is arranged within the bolsters 79 and consists of a lever 83 pivoted at 84 to operate the ejecting pin 85. The work rests upon the work holders 77 and the ejecting pin 85 slides through the holder directly beneath the work. A spring 86, located between the bolster 79 and the ejecting lever 83, is compressed by the cam piece 87, fastened to the frame 6.

The ejecting lever 83 is brought in contact with the cam piece 87 when the work table is rotated and thereby compresses the spring 86. When the ejecting lever 83 is released the spring 86 snaps the lever 83 upwardly and the work piece is ejected from between the pins 78.

The operation of the mechanism will now be described. The tapping spindles are properly adjusted in accordance with the position of the holes to be tapped. The work is inserted between the pins 78 either by hand or by means of a suitable hopper as indicated at 88. The pulley 2 rotates continuously and operates the entire mechanism with the exception of rotating the taps which in this case is accomplished by motors.

The work table is just completing its positioning movement as indicated in Figs. 2 and 3. The cam 22 has started to raise the work table to bring the work into contact with the rotating taps 31. Rotary motion of the table will be stopped with the blank portion 13 as the pinion 10 is in contact with semi-circular section 12 on gear 11. The vertical movement of the table through cam 22 will continue and the pin 29 will accurately locate and lock the table during the tapping operation.

The spring pressed tapping chuck provides a resilient means to properly feed the tap regardless of the rate of upward motion of the work relative to the rotation of the taps. By utilizing the spring means for actually feeding the tap together with the provisions on the work holder, to permit the work to float, it is possible to obtain threaded holes accurately sized. This arrangement also effectively prevents the stripping of threads and reduces the scrap to a minimum.

Further rotation of the cam 22 allows the table to be lowered by gravity. At the same time the opening in the cams 54 and 55 permits the spring 71 to operate lever 60 downwardly. The downward motion of lever 60 operates the crank arm 66 in the same direction and rotates cam 68 to bring the flat 69 beneath the projection 73. This action of cam 68 permits the member 70 to slide downward by gravity and operate the levers 74 to bring the upper tapping friction wheel 41 in contact with the drive friction 39 to reverse the direction of the tap.

When the work table is lowered and released from the locking pin 29, it is again rotated by the pinion 10. Each vertical movement taps three holes, one in each piece of work and positioned in accordance with the location of the tapping spindles. As the work table is rotated the ejecting lever 83 is depressed against the spring by the cam 87 and when released therefrom the spring operates to eject the work from the holder.

The mechanism described is for the single purpose of tapping and the various adjustments provide a flexible structure for a wide variety of work.

The number of tapping spindles can be varied in accordance with the number of holes to be tapped in any one piece. The taps can be located to suit the relative positions of the tapped holes.

The cams 54 and 55 can be adjusted to vary the dwell for tapping during the upward movement of the table in accordance with the different pitches of the threads to be tapped.

In structures heretofore used the scrap due to inaccurately sized holes or stripped threads has been considerable. With floating arrangement on the tap and work holder the scrap has been reduced to a very small percentage.

The output of machines heretofore used has been about eighteen pieces per minute with only one tapped hole. With the construction shown it has been possible to obtain thirty per minute, with three tapped holes and with considerable less waste.

In structures for tapping similar pieces the work holders were made in one piece and a set became very expensive. In this device only that part which varies with the character of the work is replaced for different shaped pieces to be tapped. The arrangement shown materially reduces the expense of maintaining a series of differently shaped work holders.

Having described my invention I claim as new and desire to secure by Letters Patent:

1. In combination a series of tapping spindles, a reversing device therefor, a series of work holders, a constantly rotating member, means operated by said member to intermittently position said work holders relative to said spindles, means to move said work holders toward and from said spindles, and means to operate said reversing device, said last two mentioned means connected to said constantly rotating member.

2. In combination a series of tapping spindles, a reversing device therefor, a series of work holders, a constantly rotating shaft, intermittent gearing connected to said shaft to position said work holders relative to said spindles, a cam connected to said shaft to move said work holders toward and from said spindles, and means connected to said shaft to operate said reversing means.

3. In combination a series of tapping spindles, a reversing device therefor, a series of work holders, a constantly rotating shaft, means connected to said shaft to intermittently position said work holders relative to said spindles, other means operated by said shaft to move said work holders toward and from said spindles, an adjustable cam connected to said shaft, and connections from said cam to operate said reversing device.

4. In combination a series of tapping spindles, a reversing device therefor, a work table, a series of work holders secured thereto, a constantly rotating member, means operated by said member to intermittently position said work table, other means connected to said member to move said work table toward and from said spindles, a locking device to prevent rotation of said work table during its movement toward and from said spindles, and means connected to said rotating member to operate said reversing means.

5. In combination a series of tapping spindles, a reversing device therefor, a series of work holders, a constantly rotating member, means operated by said member to intermittently position said work holders relative to said spindles, means operated by said member to move said work holders toward and from said spindles, a resilient tap feeding device on said tapping spindles, and means connected to said rotating member to operate said reversing means.

6. In a tapping machine the combination of a tapping spindle, a reversing device therefor, a work holder, means to feed said work holder and spindle toward each other including a resilient device on said spindle to equalize the tapping pressure, means on said work holder to permit the work to float on the tap during said feeding operation and means to operate said reversing device.

7. In a tapping machine the combination of a tapping spindle, a reversing device therefor, a clamping device, a work holder therein, means to feed said clamping device and spindle toward and from each other, a series of projections extending from said work holder within which the work is located and whereby the same is permitted to float during said feeding motion, and means to operate said reversing means.

Signed this 1st day of November 1921.

PETER MEYER.